(12) United States Patent
Naik et al.

(10) Patent No.: US 11,752,669 B2
(45) Date of Patent: *Sep. 12, 2023

(54) METHOD OF FABRICATING 3D VACUUM INSULATED REFRIGERATOR STRUCTURE HAVING CORE MATERIAL

(71) Applicant: WHIRLPOOL CORPORATION, Benton Harbor, MI (US)

(72) Inventors: Abhay Naik, Stevensville, MI (US); Christian Myles Russell, Portage, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,682

(22) Filed: Dec. 28, 2021

(65) Prior Publication Data

US 2022/0118659 A1    Apr. 21, 2022

Related U.S. Application Data

(63) Continuation of application No. 14/984,347, filed on Dec. 30, 2015, now Pat. No. 11,247,369.

(51) Int. Cl.
*B29C 43/04*    (2006.01)
*F25D 23/06*    (2006.01)
*B29L 31/00*    (2006.01)

(52) U.S. Cl.
CPC .......... *B29C 43/04* (2013.01); *F25D 23/062* (2013.01); *F25D 23/064* (2013.01); *B29L 2031/7622* (2013.01); *F25D 2201/122* (2013.01)

(58) Field of Classification Search
CPC ... B29C 43/04; F25D 23/064; F25D 2201/14; F25D 23/062; F25D 2201/122; B29L 2031/7622; B29K 2509/08
See application file for complete search history.

(56) References Cited

U.S. PATENT DOCUMENTS 948,541 A    2/1910    Coleman
1,275,511 A    8/1918    Welch
(Continued)

FOREIGN PATENT DOCUMENTS

CA    626838 A    9/1961
CA    1320631 C    7/1993
(Continued)

OTHER PUBLICATIONS

Dai et al., "Generation of Metal Nanoparticles By Laser Ablation of Microspheres," J. Aerosol Sci., vol. 29, No. 5/6 (1998), pp. 627-636.
(Continued)

*Primary Examiner* — Jerzi H Moreno Hernandez
(74) *Attorney, Agent, or Firm* — Price Heneveld LLP

(57) ABSTRACT

A method of fabricating a vacuum insulated refrigerator structure includes positioning a first barrier film in a female mold cavity. Porous filler material is positioned on the barrier film, and a second barrier film is positioned over the porous filler material. A male mold is brought into contact with the second barrier film to deform and compress the porous filler material into a 3D shape. A vacuum is formed between the first and second barrier films, and the first and second peripheral edge portions are sealed together to form a vacuum insulated core. The vacuum insulated core may be positioned between a liner and a wrapper to form an insulated refrigerator cabinet, door, or other vacuum insulated component.

20 Claims, 4 Drawing Sheets

(56) References Cited

U.S. PATENT DOCUMENTS

| | | |
|---|---|---|
| 1,849,369 A | 3/1932 | Frost |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,464,526 A | 3/1949 | Palmer |
| 2,538,780 A | 1/1951 | Hazard |
| 2,559,356 A | 7/1951 | Hedges |
| 2,644,605 A | 7/1953 | Palmer |
| 2,729,863 A | 1/1956 | Kurtz |
| 2,768,046 A | 10/1956 | Evans |
| 2,792,959 A | 5/1957 | Diamond et al. |
| 2,809,764 A | 10/1957 | Diamond |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Costantini et al. |
| 3,137,900 A | 6/1964 | Carbary |
| 3,165,221 A | 1/1965 | Kasady |
| 3,218,111 A | 11/1965 | Steiner |
| 3,258,883 A | 7/1966 | Campanaro et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,768,687 A | 10/1973 | Spencer |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,915,328 A | 10/1975 | Hawes et al. |
| 3,933,398 A | 1/1976 | Haag |
| 3,935,787 A | 2/1976 | Fisher |
| 3,995,984 A | 12/1976 | Fetherston et al. |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,118,266 A | 10/1978 | Kerr |
| 4,170,391 A | 10/1979 | Bottger |
| 4,180,297 A | 12/1979 | Abrams |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick et al. |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,732,432 A | 3/1988 | Keil et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr, Jr. et al. |
| 4,914,341 A | 4/1990 | Weaver et al. |
| 4,917,841 A | 4/1990 | Jenkins |
| 4,951,652 A | 8/1990 | Ferrario et al. |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,076,984 A | 12/1991 | Bisplinghoff et al. |
| 5,082,335 A | 1/1992 | Cur et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,269,099 A | 12/1993 | Kennedy et al. |
| 5,273,801 A | 12/1993 | Barry et al. |
| 5,284,023 A | 2/1994 | Silva et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,368,381 A | 11/1994 | Mandel |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,704,107 A | 1/1998 | Schmidt et al. |
| 5,716,581 A | 2/1998 | Tirrell et al. |
| 5,768,837 A | 6/1998 | Sjoholm |
| 5,792,539 A | 8/1998 | Hunter |
| 5,792,801 A | 8/1998 | Tsuda et al. |
| 5,813,454 A | 9/1998 | Potter |
| 5,826,780 A | 10/1998 | Nesser et al. |
| 5,827,385 A | 10/1998 | Meyer et al. |
| 5,834,126 A | 11/1998 | Sheu |
| 5,843,353 A | 12/1998 | Devos et al. |
| 5,866,228 A | 2/1999 | Awata |
| 5,868,890 A | 2/1999 | Fredrick |
| 5,876,104 A | 3/1999 | Kunkel et al. |
| 5,900,299 A | 5/1999 | Wynne |
| 5,918,478 A | 7/1999 | Bostic et al. |

(56) References Cited

U.S. PATENT DOCUMENTS

| | | |
|---|---|---|
| 5,924,295 A | 7/1999 | Park |
| 5,934,085 A | 8/1999 | Suzuki et al. |
| 5,950,395 A | 9/1999 | Takemasa et al. |
| 5,952,404 A | 9/1999 | Simpson et al. |
| 5,966,963 A | 10/1999 | Kovalaske |
| 5,972,151 A | 10/1999 | Sbrana |
| 5,985,189 A | 11/1999 | Lynn et al. |
| 6,013,700 A | 1/2000 | Asano et al. |
| 6,029,846 A | 2/2000 | Hirath et al. |
| 6,037,033 A | 3/2000 | Hunter |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,217,140 B1 | 4/2001 | Hirath et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,941 B1 | 7/2001 | Nishimoto |
| 6,266,970 B1 | 7/2001 | Nam et al. |
| 6,294,595 B1 | 9/2001 | Tyagi et al. |
| 6,305,768 B1 | 10/2001 | Nishimoto |
| 6,336,693 B2 | 1/2002 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Maughan et al. |
| 6,623,413 B1 | 9/2003 | Wynne |
| 6,629,429 B1 | 10/2003 | Kawamura et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,449,227 B2 | 11/2008 | Echigoya et al. |
| 7,475,562 B2 | 1/2009 | Jackovin |
| 7,517,031 B2 | 4/2009 | Laible |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 7,939,179 B2 | 5/2011 | DeVos et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,456,040 B2 | 6/2013 | Allard et al. |
| 8,486,215 B2 | 7/2013 | Amann et al. |
| 8,491,070 B2 | 7/2013 | Davis et al. |
| 8,516,845 B2 | 8/2013 | Wuesthoff et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,739,568 B2 | 6/2014 | Allard et al. |
| 8,752,918 B2 | 6/2014 | Kang |
| 8,752,921 B2 | 6/2014 | Gorz et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,905,503 B2 | 12/2014 | Sahasrabudhe et al. |
| 8,943,770 B2 | 2/2015 | Sanders et al. |
| 8,944,541 B2 | 2/2015 | Allard et al. |
| 8,955,352 B2 | 2/2015 | Lee et al. |
| 9,009,969 B2 | 4/2015 | Choi et al. |
| RE45,501 E | 5/2015 | Maguire |
| 9,056,952 B2 | 6/2015 | Eilbracht et al. |
| 9,062,480 B2 | 6/2015 | Litch |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,188,382 B2 | 11/2015 | Kim et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |

(56) References Cited

U.S. PATENT DOCUMENTS

| | | |
|---|---|---|
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 9,927,169 B2 | 3/2018 | Baker et al. |
| 10,024,544 B2 | 7/2018 | Bhogal et al. |
| 10,077,342 B2 | 9/2018 | An et al. |
| 11,247,369 B2 * | 2/2022 | Naik ............. F25D 23/062 |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano |
| 2004/0180176 A1 | 9/2004 | Rusek, Jr. |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer et al. |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira et al. |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0126854 A1 | 5/2009 | Khan |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0170279 A1 | 7/2010 | Aoki |
| 2010/0206464 A1 | 8/2010 | Heo et al. |
| 2010/0218543 A1 | 9/2010 | Ducharme |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horii et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0202049 A1 | 8/2012 | Valladeau et al. |
| 2012/0231204 A1 | 9/2012 | Jeon et al. |
| 2012/0237715 A1 | 9/2012 | McCracken |
| 2012/0240612 A1 | 9/2012 | Wuesthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0149481 A1 | 6/2013 | Hiemeyer et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1 | 11/2013 | Cur et al. |
| 2014/0009055 A1 | 1/2014 | Cho et al. |
| 2014/0015395 A1 | 1/2014 | Anthony et al. |
| 2014/0047775 A1 | 2/2014 | Litch |
| 2014/0097733 A1 | 4/2014 | Seo et al. |
| 2014/0132144 A1 | 5/2014 | Kim et al. |
| 2014/0162162 A1 | 6/2014 | Kalika et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0216706 A1 | 8/2014 | Melton et al. |
| 2014/0232250 A1 | 8/2014 | Kim et al. |
| 2014/0260332 A1 | 9/2014 | Wu |
| 2014/0311667 A1 | 10/2014 | Siudzinski et al. |
| 2014/0346942 A1 | 11/2014 | Kim et al. |
| 2014/0364527 A1 | 12/2014 | Wintermantel et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0047624 A1 | 2/2015 | Luckhardt et al. |
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |

(56) References Cited

U.S. PATENT DOCUMENTS

| | | | |
|---|---|---|---|
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0159942 A1 | 6/2017 | Ivanovic et al. |
| 2017/0176086 A1 | 6/2017 | Kang |
| 2017/0184339 A1 | 6/2017 | Liu et al. |
| 2017/0191746 A1 | 7/2017 | Seo |
| 2017/0368799 A1 | 12/2017 | Barbetta |

FOREIGN PATENT DOCUMENTS

| | | |
|---|---|---|
| CA | 2259665 A1 | 1/1998 |
| CA | 2640006 A1 | 8/2007 |
| CN | 1158509 C | 7/2004 |
| CN | 1970185 A | 5/2007 |
| CN | 100359272 C | 1/2008 |
| CN | 101437756 A | 5/2009 |
| CN | 201680116 U | 12/2010 |
| CN | 201748744 U | 2/2011 |
| CN | 102296714 A | 12/2011 |
| CN | 102452522 A | 5/2012 |
| CN | 102717578 A | 10/2012 |
| CN | 102720277 A | 10/2012 |
| CN | 103072321 A | 5/2013 |
| CN | 202973713 U | 6/2013 |
| CN | 203331442 U | 12/2013 |
| CN | 104816478 A | 8/2015 |
| CN | 105115221 A | 12/2015 |
| CN | 204963379 U | 1/2016 |
| DE | 1150190 B | 6/1963 |
| DE | 4110292 A1 | 10/1992 |
| DE | 4311510 A1 | 10/1994 |
| DE | 4409091 A1 | 9/1995 |
| DE | 19520020 A1 | 12/1996 |
| DE | 19818890 A1 | 11/1999 |
| DE | 19914105 A1 | 9/2000 |
| DE | 19915311 A1 | 10/2000 |
| DE | 19948361 A1 | 4/2001 |
| DE | 102008026528 A1 | 12/2009 |
| DE | 102009046810 A1 | 5/2011 |
| DE | 102010024951 A1 | 12/2011 |
| DE | 102010040346 A1 | 3/2012 |
| DE | 102011051178 A1 | 12/2012 |
| DE | 102012223536 A1 | 6/2014 |
| DE | 102012223541 A1 | 6/2014 |
| EP | 0260699 A2 | 3/1988 |
| EP | 0480451 A1 | 4/1992 |
| EP | 0645576 A1 | 3/1995 |
| EP | 0691518 A1 | 1/1996 |
| EP | 0860669 A1 | 8/1998 |
| EP | 1087186 A2 | 3/2001 |
| EP | 1200785 A1 | 5/2002 |
| EP | 1243880 A1 | 9/2002 |
| EP | 1484563 A1 | 12/2004 |
| EP | 1496322 A1 | 1/2005 |
| EP | 1505359 A1 | 2/2005 |
| EP | 1602425 A1 | 12/2005 |
| EP | 1624263 A2 | 8/2006 |
| EP | 1344008 B1 | 9/2006 |
| EP | 1338854 B1 | 12/2009 |
| EP | 2342511 A2 | 7/2011 |
| EP | 2543942 A2 | 1/2013 |
| EP | 2607073 A2 | 6/2013 |
| EP | 2789951 A1 | 10/2014 |
| EP | 2801774 A1 | 11/2014 |
| EP | 2878427 A1 | 6/2015 |
| FR | 2980963 A1 | 4/2013 |
| FR | 2991698 A1 | 12/2013 |
| GB | 837929 A | 6/1960 |
| GB | 1214548 A | 12/1970 |
| JP | 4828353 B1 | 8/1973 |
| JP | 5157777 A | 5/1976 |
| JP | 59191588 U | 12/1984 |
| JP | 6166070 A | 4/1986 |
| JP | 61168772 A | 7/1986 |
| JP | 63163764 A | 7/1988 |
| JP | 1318880 A | 12/1989 |
| JP | 03013779 A | 1/1991 |
| JP | 4165197 A | 6/1992 |
| JP | 4309778 A | 11/1992 |
| JP | 06159922 A | 6/1994 |
| JP | 71479 A | 1/1995 |
| JP | 7167377 A | 7/1995 |
| JP | 8145547 A | 6/1996 |
| JP | 08300052 A | 11/1996 |
| JP | 8303686 A | 11/1996 |
| JP | 9166271 A | 6/1997 |
| JP | 10113983 A | 5/1998 |
| JP | 11159693 A | 6/1999 |
| JP | 11311395 A | 11/1999 |
| JP | 11336990 A | 12/1999 |
| JP | 2000097390 A | 4/2000 |
| JP | 2000117334 A | 4/2000 |
| JP | 2000320958 A | 11/2000 |
| JP | 2001038188 A | 2/2001 |
| JP | 2001116437 A | 4/2001 |
| JP | 2001336691 A | 12/2001 |
| JP | 2001343176 A | 12/2001 |
| JP | 2002068853 A | 3/2002 |
| JP | 03478771 B2 | 12/2003 |
| JP | 2004303695 A | 10/2004 |
| JP | 2005069596 A | 3/2005 |
| JP | 2005098637 A | 4/2005 |
| JP | 2005114015 A | 4/2005 |
| JP | 2005164193 A | 6/2005 |
| JP | 2005256849 A | 9/2005 |
| JP | 2006064090 A | 3/2006 |
| JP | 2006077792 A | 3/2006 |
| JP | 2006161834 A | 6/2006 |
| JP | 2006161945 A | 6/2006 |
| JP | 03792801 B2 | 7/2006 |
| JP | 2006200685 A | 8/2006 |
| JP | 2007263186 A | 10/2007 |
| JP | 4111096 B2 | 7/2008 |
| JP | 2008157431 A | 7/2008 |
| JP | 2008190815 A | 8/2008 |
| JP | 2009063064 A | 3/2009 |
| JP | 2009162402 A | 7/2009 |
| JP | 2009524570 A | 7/2009 |
| JP | 2010017437 A | 1/2010 |
| JP | 2010071565 A | 4/2010 |
| JP | 2010108199 A | 5/2010 |
| JP | 2010145002 A | 7/2010 |
| JP | 2010156542 A | 7/2010 |
| JP | 04545126 B2 | 9/2010 |
| JP | 2010236770 A | 10/2010 |
| JP | 2010276309 A | 12/2010 |
| JP | 2011002033 A | 1/2011 |
| JP | 2011069612 A | 4/2011 |
| JP | 4779684 B2 | 9/2011 |
| JP | 04779684 B2 | 9/2011 |
| JP | 2011196644 A | 10/2011 |
| JP | 2012026493 A | 2/2012 |
| JP | 04897473 B2 | 3/2012 |
| JP | 2012063029 A | 3/2012 |
| JP | 2012087993 A | 5/2012 |
| JP | 2012163258 A | 8/2012 |
| JP | 2012189114 A | 10/2012 |
| JP | 2012242075 A | 12/2012 |
| JP | 2013002484 A | 1/2013 |
| JP | 2013050242 A | 3/2013 |
| JP | 2013050267 A | 3/2013 |
| JP | 2013076471 A | 4/2013 |

(56) References Cited

FOREIGN PATENT DOCUMENTS

| | | |
|---|---|---|
| JP | 2013088036 A | 5/2013 |
| JP | 2013195009 A | 9/2013 |
| KR | 20020057547 A | 7/2002 |
| KR | 20020080938 A | 10/2002 |
| KR | 20030083812 A | 11/2003 |
| KR | 20040000126 A | 1/2004 |
| KR | 20050095357 A | 9/2005 |
| KR | 100620025 B1 | 9/2006 |
| KR | 1020070044024 A | 4/2007 |
| KR | 1020070065743 A | 6/2007 |
| KR | 1020080103845 A | 11/2008 |
| KR | 20090026045 A | 3/2009 |
| KR | 1017776 B1 | 2/2011 |
| KR | 101017776 B1 | 2/2011 |
| KR | 20120007241 A | 1/2012 |
| KR | 20120046621 A | 5/2012 |
| KR | 20120051305 A | 5/2012 |
| KR | 20150089495 A | 8/2015 |
| RU | 2061925 C1 | 6/1996 |
| RU | 2077411 C1 | 4/1997 |
| RU | 2081858 C1 | 6/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 C2 | 5/2005 |
| RU | 2253792 C2 | 6/2005 |
| RU | 2349618 C2 | 3/2009 |
| RU | 2414288 C2 | 3/2011 |
| RU | 2422598 C2 | 6/2011 |
| RU | 142892 U1 | 7/2014 |
| RU | 2529525 C1 | 9/2014 |
| RU | 2571031 C2 | 12/2015 |
| SU | 203707 A1 | 12/1967 |
| SU | 476407 A1 | 7/1975 |
| SU | 547614 A1 | 5/1977 |
| SU | 648780 A1 | 2/1979 |
| SU | 1307186 A1 | 4/1987 |
| WO | 9614207 A1 | 5/1996 |
| WO | 1996032605 A1 | 10/1996 |
| WO | 9721767 A1 | 6/1997 |
| WO | 1998049506 A1 | 11/1998 |
| WO | 02060576 A1 | 4/1999 |
| WO | 9920961 A1 | 4/1999 |
| WO | 9920964 A1 | 4/1999 |
| WO | 199920964 A1 | 4/1999 |
| WO | 1999020964 A1 | 4/1999 |
| WO | 0160598 A2 | 8/2001 |
| WO | 200160598 A2 | 8/2001 |
| WO | 200202987 A1 | 1/2002 |
| WO | 02052208 A1 | 7/2002 |
| WO | 2002052208 A1 | 7/2002 |
| WO | 02060576 A1 | 8/2002 |
| WO | 03072684 A1 | 9/2003 |
| WO | 2003089729 A1 | 10/2003 |
| WO | 2004010042 A1 | 1/2004 |
| WO | 2006045694 A1 | 5/2006 |
| WO | 2006073540 A2 | 7/2006 |
| WO | 2006120183 A1 | 11/2006 |
| WO | 2006120198 A2 | 11/2006 |
| WO | 2007033836 A1 | 3/2007 |
| WO | 2007085511 A1 | 8/2007 |
| WO | 2007106067 A2 | 9/2007 |
| WO | 2008065453 A1 | 6/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 A1 | 12/2009 |
| WO | 2010007783 A1 | 1/2010 |
| WO | 2010029730 A1 | 3/2010 |
| WO | 2010043009 A2 | 4/2010 |
| WO | 2010092627 A1 | 8/2010 |
| WO | 2010127947 A2 | 11/2010 |
| WO | 2011003711 A2 | 1/2011 |
| WO | 2011058678 A1 | 5/2011 |
| WO | 2011081498 A2 | 7/2011 |
| WO | 2012023705 A2 | 2/2012 |
| WO | 2012026715 A2 | 3/2012 |
| WO | 2012031885 A2 | 3/2012 |
| WO | 2012043990 A2 | 4/2012 |
| WO | 2012044001 A2 | 4/2012 |
| WO | 2012085212 A2 | 6/2012 |
| WO | 2012119892 A1 | 9/2012 |
| WO | 2013116103 A1 | 8/2013 |
| WO | 2013116302 A1 | 8/2013 |
| WO | 2014038150 A1 | 3/2014 |
| WO | 2014095542 A1 | 6/2014 |
| WO | 2014121893 A1 | 8/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Raszewski et al., "Methods For Producing Hollow Glass Microspheres," Powerpoint, cached from Google, Jul. 2009, 6 pages.
Basf, "Balindur™ Solutions for fixing Vaccum Insulated Panels," web page, 4 pages, date unknown, http://performance-materials.basf.us/products/view/family/balindur, at least as early as Dec. 21, 2015.
Basf, "Balindur™," web page, 2 pages, date unknown, http://product-finder.basf.com/group/corporate/product-finder/en/brand/BALINDUR, at least as early as Dec. 21, 2015.
PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.
European Patent Application No. 13775196.2, Supplemental Search Report, dated Dec. 7, 2015, 10 pages.
European Patent Application No. 14158608.1, Search Report, dated Sep. 30, 2014, 5 pages.
International Patent Application No. PCT/US2013036203, International Search Report, dated Jul. 26, 2013, 10 pages.
European Patent Application No. 15154577.9, Search Report, dated Jul. 20, 2015, 8 pages.
European Patent Application No. 14158619, Search Report, dated Jun. 22, 2015, 9 pages.
European Patent Application No. 15153481, Search Report, dated Jul. 10, 2015, 6 pages.
KitchenAid, "Refrigerator user instructions," Sep. 5, 2015, 120 pages.
International Search Report, Application No. PCT/US2017/021068, dated Nov. 2, 2017, 9 pages.
International Search Report, Application No. PCT/US2016/020896, dated May 12, 2016. 3 pages.
European Search Report, Application No. EP14158615, dated Jun. 24, 2015, 5 pages.
International Searching Authority, "Search Report," issued in connection with International Patent Application No. PCT/US2016/062479, dated Feb. 9, 2017, 8 pages.
International Searching Authority, "Search Report," issued in connection with International Patent Application No. PCT/US2016/060947, dated Feb. 2, 2017, 8 pages.
International Searching Authority, "Search Report," issued in connection with International Patent Application No. PCT/US2016/061125, dated Jan. 12, 2017, 9 pages.
International Searching Authority, "Search Report," issued in connection with International Patent Application No. PCT/US2016/062453, dated Feb. 9, 2017, 8 pages.
International Searching Authority, "Search Report," issued in connection with International Patent Application No. PCT/US2016/061790, dated Jan. 26, 2017, 8 pages.
International Searching Authority, "Search Report," issued in connection with International Patent Application No. PCT/US2016/062029, dated Jan. 26, 2017, 8 pages.

(56) References Cited

OTHER PUBLICATIONS

International Searching Authority, "Search Report," issued in connection with International patent Application No. PCT/US2016/060961, dated Feb. 2, 2017, 9 pages.
International Search Report, International Application No. PCT/US2016/060519, dated Mar. 16, 2017, 10 pages.
International Search Report, International Application No. PCT/US2016/062804, dated Feb. 27, 2017, 9 pages.
International Search Report, International Application No. PCT/US2016/063023, dated Mar. 30, 2017, 7 pages.
International Search Report, International Application No. PCT/US2016/063065, dated Apr. 20, 2017, 9 pages.
International Search Report, International Application No. PCT/US2016/063355, dated Feb. 27, 2017, 9 pages.
International Search Report, International Application No. PCT/US2016/063958, dated Mar. 6, 2017, 10 pages.
International Search Report, PCT/US2016/043991, dated Apr. 27, 2017, 8 pages.
International Search Report, PCT/US2016/047558, dated Jun. 8, 2017, 9 pages.
International Search Report, PCT/US2016/062189, dated Mar. 30, 2017, 7 pages.
International Search Report, PCT/US2016/053711, dated Aug. 31, 2017, 8 pages.
International Search Report, PCT/US2016/054639, dated Aug. 17, 2017, 8 pages.
International Search Report, PCT/US2016/057271, dated Aug. 17, 2017, 8 pages.
International Search Report, PCT/US2017/017802, dated Sep. 28, 2017, 9 pages.
International Search Report, PCT/US2017/019930, dated Sep. 28, 2017, 9 pages.
International Search Report, Application No. PCT/US2016/054067, dated Jun. 29, 2017, 7 pages.
International Search Report, Application No. PCT/US2016/054121, dated Jul. 6, 2017, 9 pages.
International Search Report, Application No. PCT/US2016055161, dated Jun. 29, 2017, 9 pages.
International Search Report, Application No. PCT/US2016/055304, dated Jun. 29, 2017, 9 pages.

\* cited by examiner

METHOD OF FABRICATING 3D VACUUM INSULATED REFRIGERATOR STRUCTURE HAVING CORE MATERIAL

CROSS REFERENCE TO RELATED APPLICATION

The present application is a Continuation of U.S. patent application Ser. No. 14/984,347 filed on Dec. 30, 2015, entitled "METHOD OF FABRICATING 3D VACUUM INSULATED REFRIGERATOR STRUCTURE HAVING CORE MATERIAL," which is hereby incorporated herein by reference.

BACKGROUND OF THE INVENTION

Various types of vacuum insulated refrigerator cabinets, doors, and other such structures have been developed. However, known methods of forming vacuum insulated structures may suffer from various drawbacks and limitations.

SUMMARY OF THE INVENTION

A method of fabricating a vacuum insulated refrigerator structure includes positioning a first barrier film in a female mold cavity. Porous filler material is positioned on the first barrier film, and a second barrier film is positioned over the porous filler material. The first and second barrier films have first and second peripheral edge portions, respectively. The porous filler material is disposed between the first and second barrier films. A male mold is brought into contact with the second barrier film to thereby cause the porous filler material to deform into a 3D shape including a central portion and at least one sidewall portion that extends transversely from the central portion. A vacuum is formed between the first and second barrier films, and the first and second peripheral edge portions are sealed together to form a vacuum insulated core having porous filler material disposed in a vacuum. The vacuum insulated core may be positioned between a liner and a wrapper to form an insulated refrigerator cabinet, door, or other insulated refrigerator component.

These and other features, advantages, and objects of the present disclosure will be further understood and appreciated by those skilled in the art by reference to the following specification, claims, and appended drawings.

BRIEF DESCRIPTION OF THE DRAWINGS

FIG. 1.

DETAILED DESCRIPTION

Figure 2:
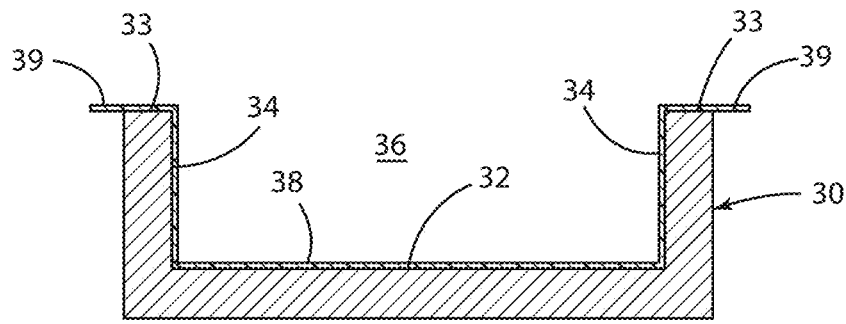
FIG. 2 is a partially schematic view of a female mold part and first barrier film.

For purposes of description herein, the terms "upper," "lower," "right," "left," "rear," "front," "vertical," "horizontal," and derivatives thereof shall relate to the disclosure as oriented in FIG. 2. However, it is to be understood that the disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
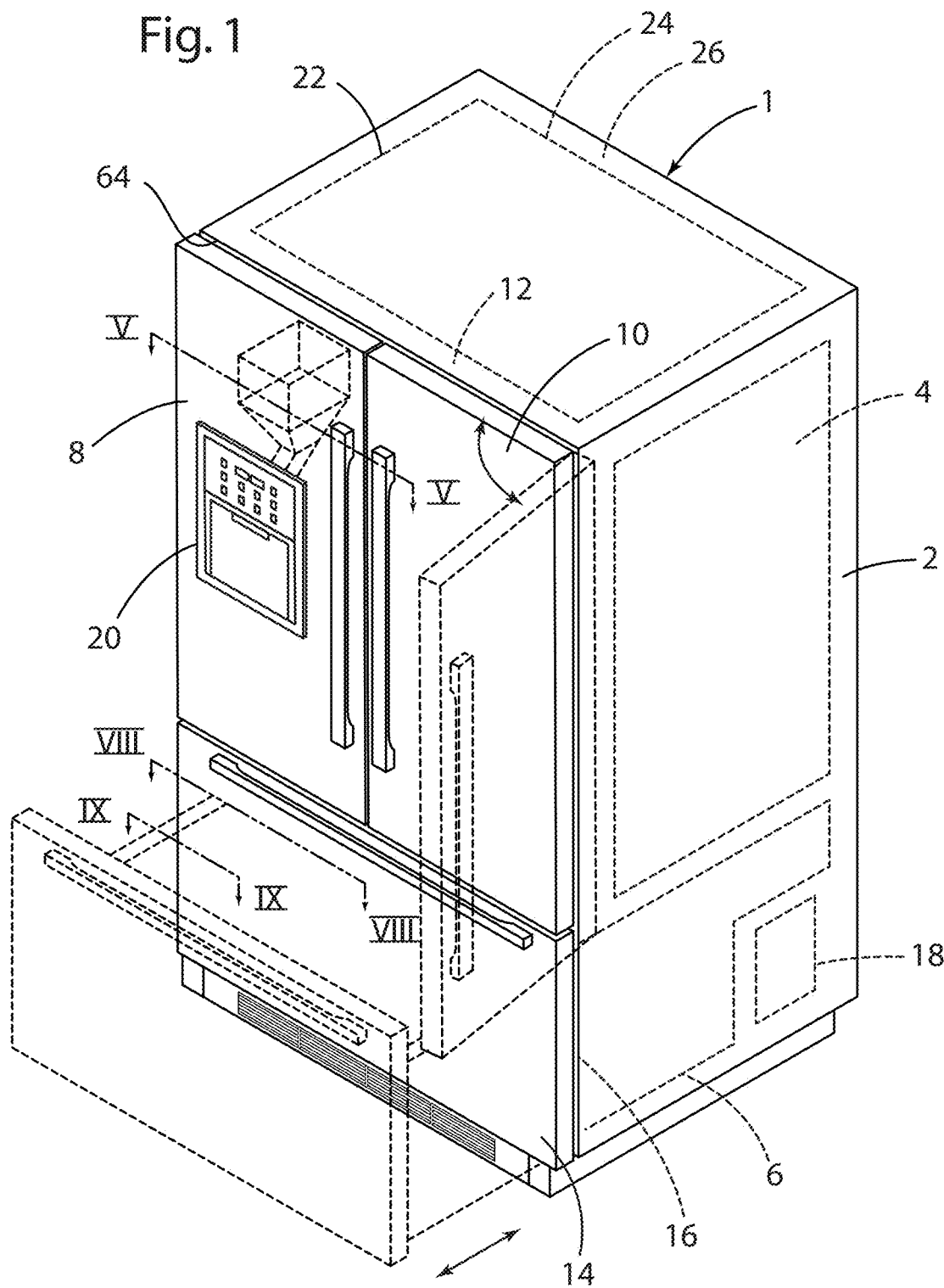
FIG. 1 is an isometric view of a refrigerator.

With reference to FIG. 1, a refrigerator 1 may include a vacuum insulated cabinet 2 forming a fresh food compartment 4 and a freezer compartment 6. Doors 8 and 10 are movably mounted to the cabinet 2, and selectively close off an access opening 12 that provides access to the fresh food compartment 4. A door or drawer 14 selectively closes off an access opening 16 that provides access to freezer compartment 6. A cooling system (not shown) including a compressor, condenser, evaporator, and other related components may be positioned in a machine compartment 18 located at a lower rear portion of cabinet 2. Door 8 may include an ice/water dispenser 20.

The cabinet 2 may comprise a vacuum insulated structure having an outer wrapper 22, an inner liner 24 that fits within the outer wrapper 22, and a vacuum insulated core structure 26 that is disposed between the wrapper 22 and liner 24. One or more of the doors 8, 10, and 14 may also comprise vacuum insulated structures having an outer wrapper or panel, inner liner, and vacuum insulated core disposed between the outer panel and the inner liner.

With reference to FIGS. 2-5, the cabinet 2 and/or doors 8, 10, and 14 may be fabricated utilizing a female mold 30 and a male mold 40. The female mold 30 may include a generally planar interior surface 32 and one or more inwardly facing side walls or surfaces 34 that together form a mold cavity 36. In the illustrated example, the female mold 30 includes four generally planar side surfaces 34 that are orthogonal relative to one another such that female mold 30 is generally bathtub-shaped.

Figure 3:
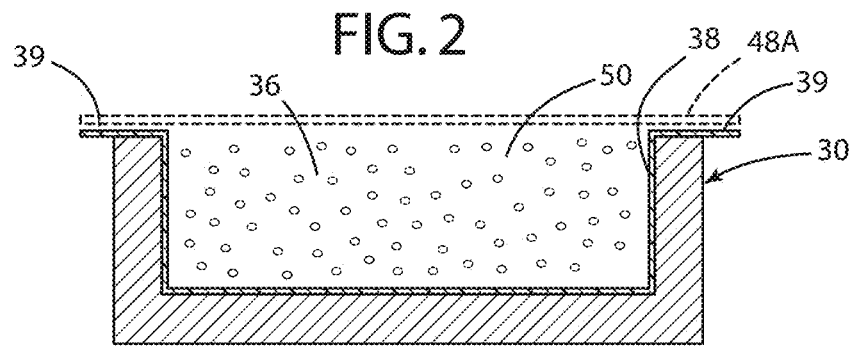
FIG. 3 is a partially schematic view showing porous insulation powder disposed over at least a portion of the first barrier film in the female mold part.

A vacuum insulated core component may be fabricated by placing a first barrier film 38 in the mold cavity 36 with the first barrier film 38 positioned closely against surfaces 32 and 34. The first barrier film 38 includes peripheral edge portions 39 that are positioned directly against edge surfaces 33 of female mold 30. With further reference to FIG. 3, porous filler material 50 is then positioned in the female mold cavity 36 over at least a portion of first barrier film 38. Porous filler material 50 may comprise silica powder, glass fibers, or other suitable material that is capable of being deformed as required for a particular application.

Figure 4:
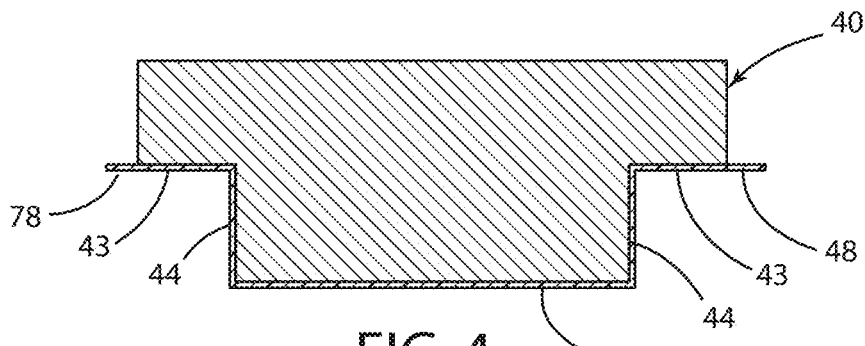
FIG. 4 is a partially schematic view of a male mold part having a second barrier film positioned on the male mold part.
Figure 5:
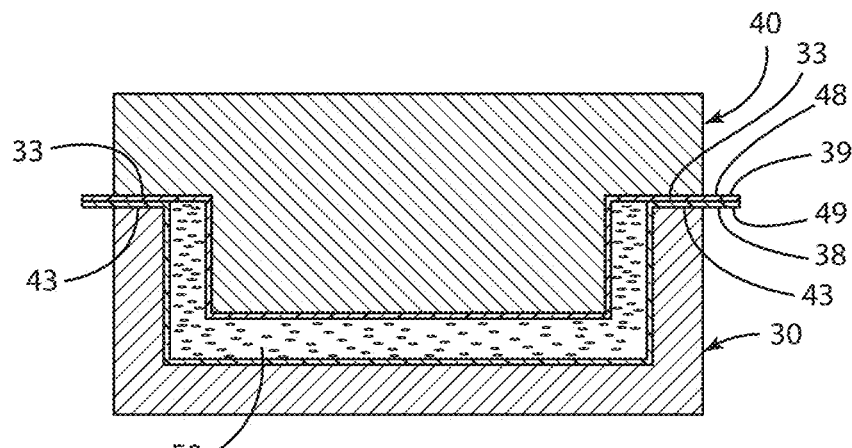
FIG. 5 is a partially schematic view showing a core position between male and female mold parts.

With reference to FIG. 4, a male mold part 40 includes a generally planar central portion 42, outwardly-facing side surfaces 44, and edge surface portions 43. Male mold part 40 may include four outwardly facing surfaces 44 that are orthogonal relative to one another. A second barrier film 48 is positioned over or on the male mold 40, and the female and male mold components 30 and 40 are then brought together as shown in FIG. 5 to compress the silica powder 50 between barrier films 38 and 48. Alternatively, second barrier film 48 may be positioned over female mold 30 as shown by dashed lines 48A rather than positioning second barrier film 48 on male mold 40. The peripheral edge portions 39 and 49 of barrier films 38 and 48 overlap one another, and may be pressed together by surfaces 33 and 43 of female and male mold parts 30 and 40, respectively.

Figure 6:
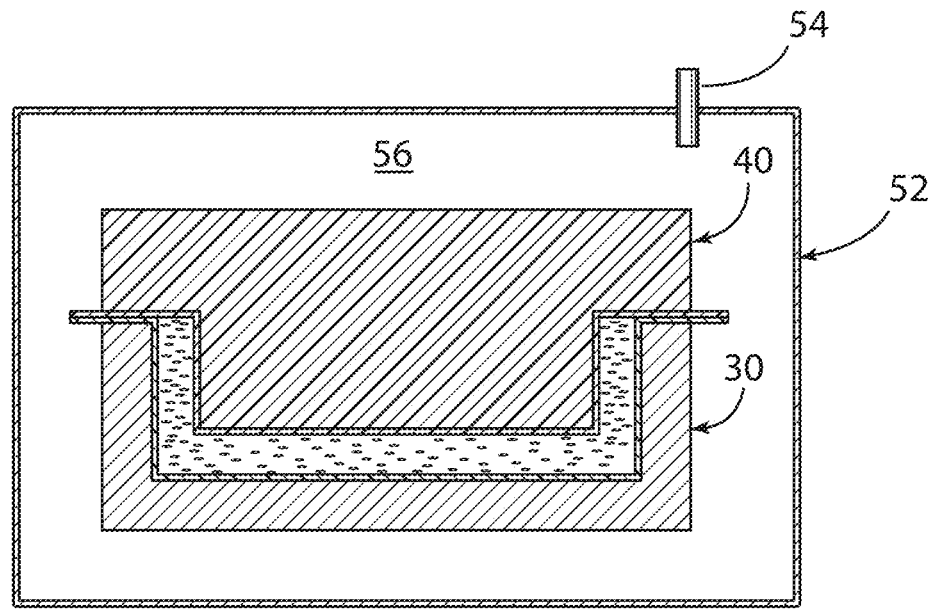
FIG. 6 is a partially schematic view showing the mold inside a vacuum chamber.
Figure 7:
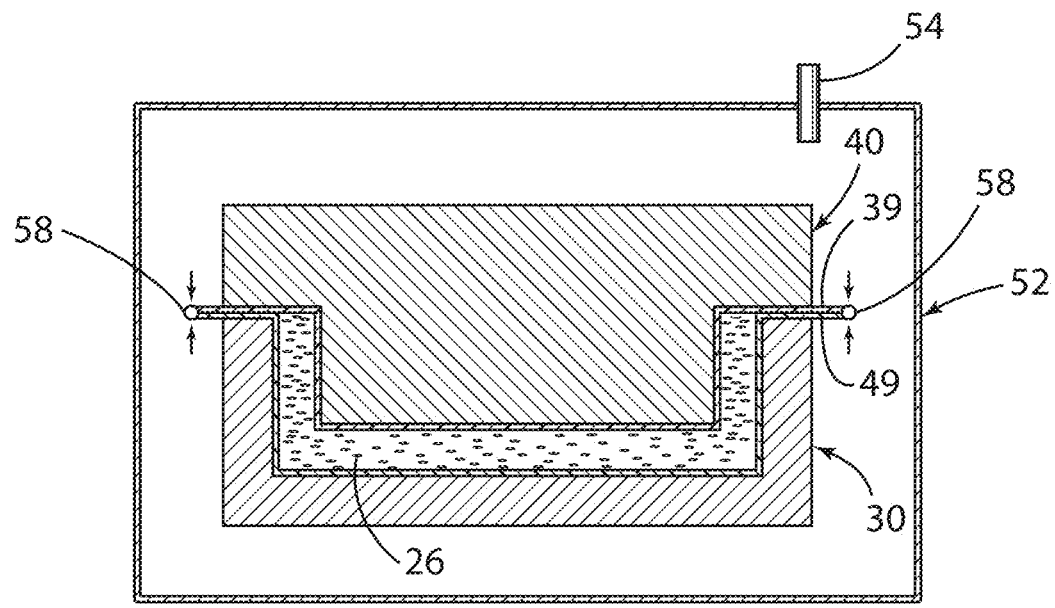
FIG. 7 is a partially schematic view showing the mold inside a vacuum chamber as the peripheral edge portions of the first and second barrier films are sealed together.

With further reference to FIG. 6, the female and male mold parts 30 and 40 are then positioned within a vacuum chamber 52, and air is evacuated from the vacuum chamber 52 through an opening or passageway 54 utilizing a vacuum pump (not shown) or other suitable mechanism to thereby form a vacuum in the space 56 inside vacuum chamber 52. With further reference to FIG. 7, the peripheral edge portions 39 and 49 of barrier films 38 and 48, respectively are then sealed along a seal line 58 utilizing heat sealing, adhesives, or other suitable known processes. The seal line 58 may include 4 substantially straight edge portions if the refrigerator component (e.g. cabinet 2, or doors 8, 10, or 14) have a rectangular perimeter. Barrier films 38 and 48 may comprise multilayer polymer and/or metal foil that is impervious to oxygen, nitrogen, carbon dioxide water vapor, and other gasses as may be required to maintain a vacuum.

Figure 8:
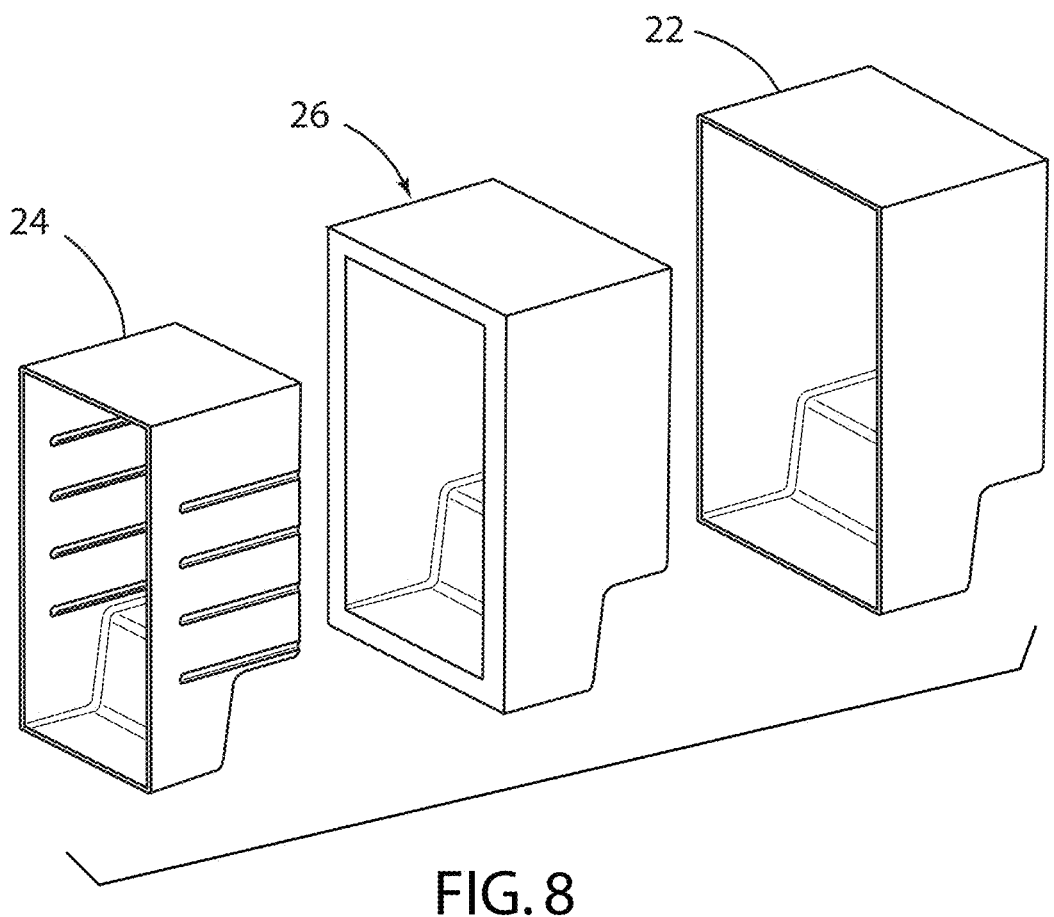
FIG. 8 is a partially schematic cross sectional view of a 3D vacuum insulated core disposed between a liner and wrapper.
Figure 9:
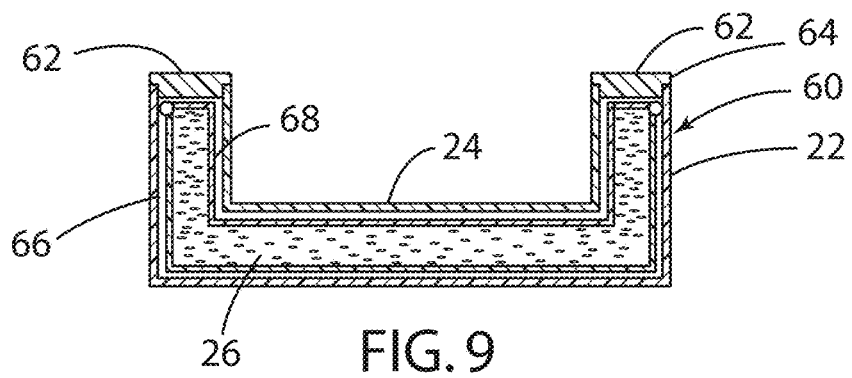
FIG. 9 is a cross sectional view of a vacuum insulated refrigerator structure taken along the line IX-IX.

With further reference to FIGS. 8 and 9, vacuum insulated core 26 is then removed from the vacuum chamber 52, and the core 26 is positioned between a wrapper 22 and a liner 24 to form a 3D vacuum insulated refrigerator component 60. The wrapper 22 and liner 24 may be interconnected utilizing known structures and processes. A small gap or space 66 (FIG. 9) may be formed between vacuum insulated core 26 and outer wrapper 22. Similarly, a small gap or space 68 may be formed between liner 24 and vacuum insulated core 26. The gaps 66 and/or 68 may be filled with adhesive and/or polyurethane foam (not shown) to interconnect the vacuum insulated core 26 to the wrapper 22 and liner 24, and to fill the gaps 66 and 68 to reduce or prevent flexing of wrapper 22 and liner 24. If the refrigerator component 60 comprises a cabinet 2, the forward edge 64 of the cabinet 2 may include an edge strip 62 that is sealingly connected to the wrapper 22 and liner 24.

It will be understood that the 3D vacuum core may have various shapes and sizes as required for a particular application. For example, the 3D vacuum core may be configured to be utilized in a refrigerator cabinet as described above, or it may be configured to be utilized in a refrigerator door or other component.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method of fabricating a vacuum insulated refrigerator structure, the method comprising:
   providing a female mold having a female mold cavity that is defined by a central surface portion and a plurality of inwardly facing side wall surface portions that are transverse to the central surface portion, the female mold further including edge surfaces extending transversely outward from the inwardly facing side wall surface portions and away from the female mold cavity;
   providing a male mold having a central surface portion and a plurality of outwardly facing side wall surface portions that are transverse to the central surface portion of the male mold, the male mold further including edge surfaces extending transversely outward from the outwardly facing side wall surface portions;
   positioning the male and female molds in a vacuum chamber;
   positioning an impermeable first barrier film having a first peripheral edge portion in the female mold cavity adjacent to the central surface portion and adjacent to the inwardly facing side wall surface portions;
   positioning the first peripheral edge portion of the impermeable first barrier film over the edge surfaces of the female mold;
   positioning porous powder filler material on the impermeable first barrier film;
   followed by positioning an impermeable second barrier film having a second peripheral edge portion over the porous powder filler material whereby the porous powder filler material is disposed between the impermeable first and second barrier films;
   positioning the second peripheral edge portion of the impermeable second barrier film over the first peripheral edge portion of the impermeable first barrier film;
   bringing the female and male molds together;
   causing the male mold to press against the impermeable second barrier film to thereby deform the impermeable second barrier film from a first shape into a second shape;
   causing the central surface portion of the male mold and at least a portion of the plurality of outwardly facing side wall surface portions of the male mold to enter the female mold cavity thereby causing the second barrier film and the porous powder filler material to deform into a shape including a central portion having a substantially uniform thickness, the shape including at least one sidewall portion extending transversely from the central portion;
   causing the porous powder filler material to contact the impermeable first and second barrier films;
   followed by pressing the first and second peripheral edge portions together between the edge surfaces of the male and female molds by bringing the male and female molds together to define a closed configuration;
   followed by evacuating air between the impermeable first and second barrier films by forming a vacuum in the vacuum chamber;
   followed by sealing the first and second peripheral edge portions together along a seal line while the male and female molds are in the closed configuration in the vacuum chamber to form a vacuum insulated core;
   followed by removing the vacuum insulated core from the vacuum chamber;
   followed by positioning the vacuum insulated core between a wrapper and a liner; and
   followed by connecting the wrapper to the liner to form the vacuum insulated refrigerator structure.

2. The method of claim 1, wherein:
   outer edges of the impermeable first and second barrier films are disposed outside of the male and female molds when the male and female molds are in the closed configuration.

3. The method of claim 1, wherein:
   the impermeable second barrier film is planar prior to causing the male mold to press against the impermeable second barrier film.

4. The method of claim 1, including:
positioning the impermeable second barrier film on the male mold before bringing the male and female molds together.

5. The method of claim 1, wherein:
the central surface portion of the female mold cavity is substantially planar and free of protrusions.

6. The method of claim 1, wherein:
the central surface portion of the male mold cavity is substantially planar and free of protrusions.

7. The method of claim 1, wherein:
the inwardly facing side wall surface portions of the female mold are substantially orthogonal to the central surface portion.

8. The method of claim 1, wherein:
the central surface portion of the female mold and the central surface portion of the male mold are rectangular;
the impermeable first and second barrier films comprise multilayer films; and
the porous powder filler material comprises silica powder.

9. The method of claim 1, wherein:
the vacuum insulated refrigerator structure comprises a door.

10. A method of fabricating a vacuum insulated refrigerator structure, the method comprising:
providing a mold tool having a female mold and a male mold, wherein the female mold has a female mold cavity and a central surface portion, and wherein the male mold has a central surface portion;
positioning a central portion of a first barrier film in the female mold cavity over the central surface portion;
positioning porous powder filler material on the central portion of the first barrier film;
positioning a central portion of a second barrier film over the female mold cavity;
followed by bringing the female and male molds together;
causing the male mold to deform the second barrier film from a first shape into a second shape, the second shape including a generally planar central portion and at least one sidewall portion extending transversely from the generally planar central portion;
wherein bringing the female and male molds together further includes causing the female and male molds to compress the porous powder filler material;
followed by forming at least a partial vacuum between the first and second barrier films;
followed by sealing the first and second peripheral edge portions together to form a vacuum insulated core having porous powder filler material disposed in a vacuum formed between the first and second barrier films;
followed by moving the female and male molds apart;
followed by removing the vacuum insulated core from the mold tool;
followed by positioning the vacuum insulated core between a wrapper and a liner; and
connecting the wrapper to the liner to form the vacuum insulated refrigerator structure.

11. The method of claim 10, wherein:
the central surface portion of the female mold cavity is free of protrusions.

12. The method of claim 10, wherein:
the central surface portion of the male mold is free of protrusions.

13. The method of claim 10, wherein:
the central surface portion of the female mold is substantially planar;
the female mold includes four inwardly facing side wall surface portions that are transverse to the central surface portion;
the central surface portion of the male mold is substantially planar, the male mold including four outwardly facing side wall surface portions that are transverse to the central surface portion of the male mold.

14. The method of claim 10, wherein:
bringing the female and male molds together includes causing the central surface portion of the male mold to be disposed in the female mold cavity.

15. The method of claim 10, wherein:
the first and second barrier films comprise multilayer films.

16. The method of claim 10, including:
causing the first and second peripheral edge portions to overlap prior to sealing the first and second peripheral edge portions together.

17. A method of fabricating a vacuum insulated refrigerator structure, the method comprising:
positioning a first barrier film having a first peripheral edge portion in a female mold cavity;
positioning porous filler material on the barrier film;
positioning a second barrier film having a second peripheral edge portion over the porous filler material whereby the porous filler material is disposed between the first and second barrier films;
utilizing a male mold that is in contact with the second barrier film to press the second barrier film and cause the porous filler material to deform into a shape including a central portion and at least one sidewall portion extending transversely from the central portion;
evacuating air from between the first and second barrier films; and
followed by sealing the first and second peripheral edge portions together to form a vacuum insulated core having porous filler material disposed in a vacuum.

18. The method of claim 17, wherein:
the female mold includes a generally planar central surface portion and at least one inwardly facing side wall surface portion that is generally orthogonal to the central surface portion.

19. The method of claim 17, wherein:
the male mold includes a generally planar central surface portion and at least one outwardly facing side wall surface portion that is generally orthogonal to the central surface portion of the male mold.

20. The method of claim 19, wherein:
the central surface portion of the female mold and the central surface portion of the male mold are substantially free of protrusions.

* * * * *